(12) United States Patent
Kang

(10) Patent No.: US 6,216,478 B1
(45) Date of Patent: Apr. 17, 2001

(54) OPERATION SPEED CHANGE SYSTEM AND METHOD FOR REFRIGERATOR

(75) Inventor: Kwang Hwa Kang, Changwon (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/372,594

(22) Filed: Aug. 12, 1999

(30) Foreign Application Priority Data

Dec. 9, 1998 (KR) .................................................. 98-53916

(51) Int. Cl.$^7$ ....................................................... F25B 1/00
(52) U.S. Cl. ............................................ 62/228.4; 62/231
(58) Field of Search .................................... 62/228.4, 229, 62/231, 228.1, 215

(56) References Cited

U.S. PATENT DOCUMENTS

| | | | |
|---|---|---|---|
| 4,283,920 | * 8/1981 | Kainuma et al. | 62/228 X |
| 4,959,969 | * 10/1990 | Okamoto et al. | 62/228.4 X |
| 5,228,300 | * 7/1993 | Shim | 62/229 X |
| 5,460,009 | * 10/1995 | Wills et al. | 62/229 X |
| 5,548,969 | * 8/1996 | Lee | 62/228.4 |
| 5,592,827 | * 1/1997 | Jeong et al. | 62/229 |

\* cited by examiner

Primary Examiner—Corrine McDermott
Assistant Examiner—Chen-Wen Jiang
(74) Attorney, Agent, or Firm—Fleshner & Kim, LLP

(57) ABSTRACT

An operation speed change system and method for an inverter refrigerator which includes: a power sensing means for sensing an input of power in an initial state; a mode selection sensing means for sensing a mode selection of the user; a circumferential temperature sensing means for sensing a temperature in the vicinity of the refrigerator; a temperature comparing means for determining whether the temperature sensed by the circumferential temperature sensing means is higher than a previously set temperature; a door opening sensing means for sensing the door opening of the refrigerator; an interior temperature sensing means for sensing a temperature inside the refrigerator; a time lapse determining means for measuring the predetermined time elapsed from a referential point of time when the door opening is sensed by the door opening sensing means; a frequency setting means for setting a frequency in accordance with outputs from the power sensing means, the mode selection sensing means, the temperature comparing means, the door opening sensing means, the interior temperature sensing means and the time lapse determining means; and a compressor driving means for driving a motor at the frequency determined by the frequency setting means and outputting a signal to the time lapse determining means for the referential point of time.

20 Claims, 4 Drawing Sheets

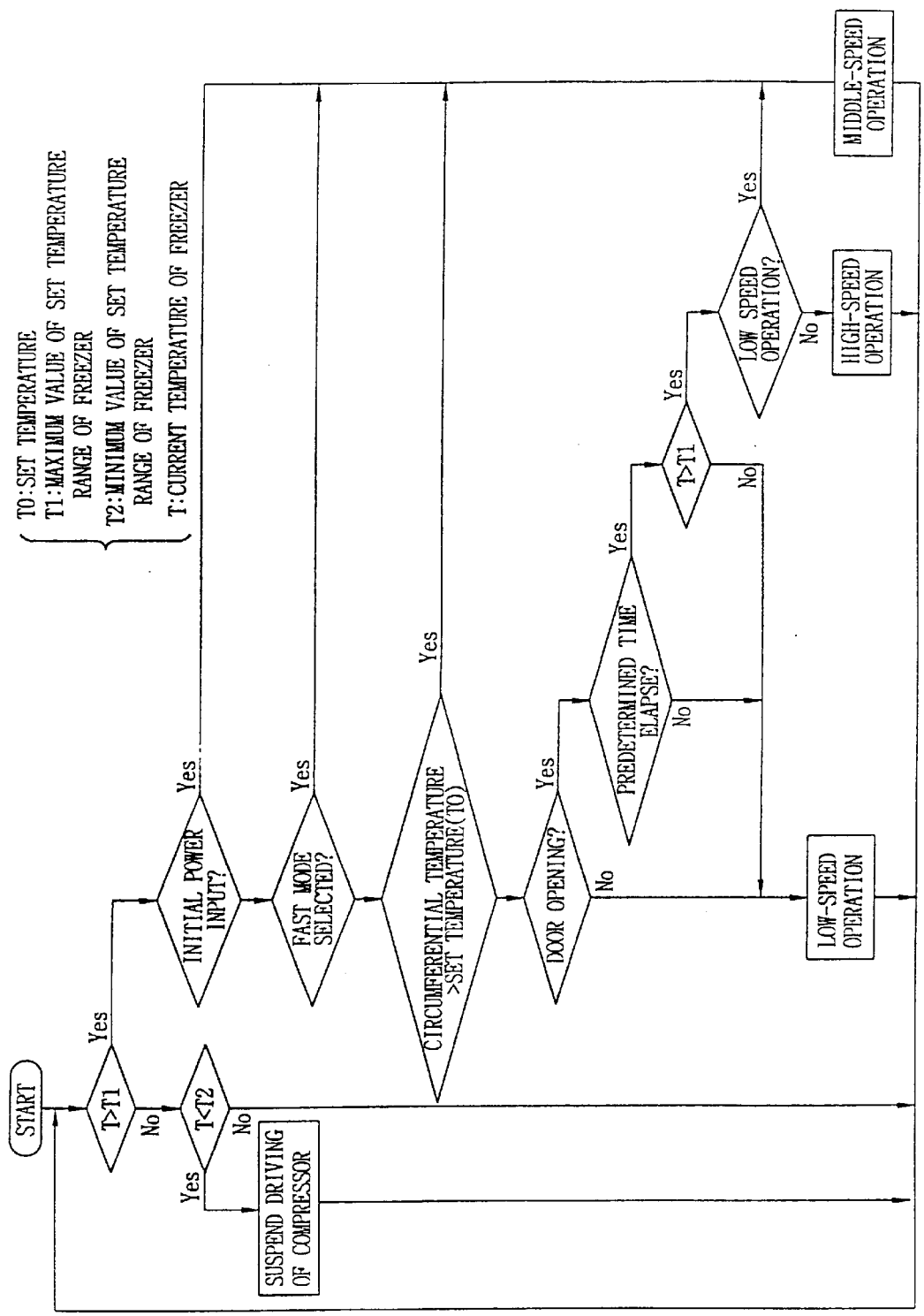

OPERATION SPEED CHANGE SYSTEM AND METHOD FOR REFRIGERATOR

BACKGROUND OF THE INVENTION

1. Field of the Invention

The present invention relates to an operation speed change system and method for a refrigerator, and more particularly to, in the driving of a compressor of an inverter refrigerator an operation speed of which is variable, an operation speed change system and method for a refrigerator that improves power consumption of the refrigerator by varying an operation frequency of the refrigerator by sensing the change of a temperature inside the refrigerator in accordance with various conditions such as a fast mode selection by a user, the temperature change outside the refrigerator and the closing/opening of the refrigerator.

2. Description of the Conventional Art

FIG. 1 is a schematic diagram of a general refrigerator. As shown therein, the refrigerator includes a compressor 13 supplying a gaseous refrigerant with high temperature and pressure, an evaporator 11 cooling down a freezer 20 and a cold-storage room 30 through a heat exchange with peripheral units by evaporating the refrigerant supplied from the compressor 13 which becomes a liquid state at low temperature and pressure while passing through a condenser (not shown) and a capillary (not shown), a damper 12 controlling a temperature inside the cold-storage room 30 by supplying or excluding cool air come from the freezer 20 to the cold-storage room 30, and a freeze fan motor 10 driving a freeze fan 14 which forcibly sends the cool air to the freezer 20 as the process of cool air circulation.

Now, the operation of the refrigerator will be described with reference to FIG. 1.

When power is supplied, the compressor 13 compresses the gaseous refrigerant to have high temperature and pressure and the compressed refrigerant is supplied to the evaporator 11 through the condenser and the capillary. The evaporator 11 evaporates the refrigerant which has become the liquid state with low temperature and pressure while passing through the condenser and the capillary from compressor 13, thereby supplying the refrigerant to the freezer 20 and the cold-storage room 30 through the heat exchange with the peripheral units to cool down the interior of the refrigerator.

The damper 12 controls the temperature of the cold-storage room 30 by supplying or excluding the cool air provided from the freezer 20, and the freeze fan motor 10 drives the freeze fan 14 to supply the cool air produced from the evaporator 11 to the freezer 20, whereby the cool air circulation occurs. In addition, in the driving of the compressor, an operation frequency is uniformly fixed (generally, fixed at 60 Hz) and when the temperature inside the refrigerator becomes higher than a predetermined temperature, the compressor starts operating and then suspends its operation when reaching the predetermined temperature.

In the conventional art, however, there is problem in that since the operation frequency of the compressor is uniformly fixed, generally, at 60 Hz, it is impossible to achieve a flexible operation of the compressor in accordance with the change of the interior conditions of the refrigerator.

For instance, when food is placed in the refrigerator by opening a door thereof and when the temperature inside the refrigerator increases because the load of the food is large, the temperature inside the refrigerator must be decreased to an appropriate level by rapidly driving the compressor. However, since the operation frequency is fixed, it is difficult to cope with the temperature change within the limited time, which results in a loss of its freshness. Contrarily, although the food with a small load is placed in the refrigerator, the compressor is driven with the operation frequency which is higher than an actually required frequency, whereby an energy is unnecessarily consumed.

SUMMARY OF THE INVENTION

Accordingly, the present invention is directed to an operation speed change system and method for an inverter refrigerator which obviates the problems and disadvantages in the conventional art.

An object of the present invention is to provide an operation speed change system and method for an inverter refrigerator that maintains freshness of food and improves power consumption of the refrigerator by flexibly changing an operation frequency of a compressor when driving the compressor.

To achieve these and other advantages and in accordance with the purpose of the present invention, as embodied and broadly described herein, there is provided an operation speed change system for an inverter refrigerator which includes: a power sensing means for sensing an input of power in an initial state; a mode selection sensing means for sensing a mode selection of the user; a circumferential temperature sensing means for sensing a temperature in the vicinity of the refrigerator; a temperature comparing means for determining whether the temperature sensed by the circumferential temperature sensing means is higher than a previously set temperature; a door opening sensing means for sensing the door opening of the refrigerator; an interior temperature sensing means for sensing a temperature inside the refrigerator; a time lapse determining means for measuring the predetermined time elapsed from a referential point of time when the door opening is sensed by the door opening sensing means; a frequency setting means for setting a frequency in accordance with outputs from the power sensing means, the mode selection sensing means, the temperature comparing means, the door opening sensing means, the interior temperature sensing means and the time lapse determining means; and a compressor driving means for driving a motor at the frequency determined by the frequency setting means and outputting a signal to the time lapse determining means for the referential point of time.

Also, to achieve the object of the present invention, there is provided an operation speed change method for an inverter refrigerator which includes the following steps: (a) determining whether a current temperature inside the refrigerator is greater than a maximum value of a previously set temperature range of a freezer; (b) determining whether or not it is an initial power input when the current temperature inside the refrigerator is greater than the maximum value of the previously set temperature range of the freezer; (c) performing a high-speed operation when it is determined to be the initial power input or determining whether a fast mode is selected when it is not determined to the initial power input; (d) performing the highspeed operation when the fast mode is inputted or determining whether a peripheral temperature is higher than a predetermined set temperature if the fast mode is not selected; (e) performing the high-speed operation when the peripheral temperature is higher than the predetermined set temperature, or determining whether there was a door opening when the peripheral temperature is lower than the predetermined set temperature;

and (f) operating at a predetermined referential frequency when there was no door opening and then returning to step (a), or sensing a temperature inside the refrigerator at predetermined time intervals when there was the door opening, thereby increasing a predetermined frequency by one step until the temperature inside the refrigerator becomes below the maximum value of the previously set temperature range of the freezer when the sensed temperature inside the refrigerator is above the maximum value thereof, or suspending the driving of a compressor when the sensed temperature inside the refrigerator is below the maximum value thereof, wherein step (f) includes: (g) determining whether a predetermined time has elapsed when it is determined there was the door opening in step (e); (h) determining whether the current temperature inside the freezer is greater than the maximum value the previously set temperature range of the freezer; (i) operating at a predetermined referential frequency (a low-speed operation) and then returning to step (a), when it is determined in steps (g),(h) that the predetermined time has not elapsed or that the current temperature inside the freezer is smaller than the maximum value the previously set temperature range of the freezer; (j) determining whether it is the low-speed operation when it is determined in step (i) that the current temperature inside the freezer is larger than the maximum value the previously set temperature range of the freezer; and (k) operating by increasing the frequency by one step (a middle-speed operation) when it is determined in step (j) to be the low-speed operation, or increasing the frequency by one step from the middle-speed operation to a high-speed operation when it is not determined to the low-speed operation and then suspending the operation of the compressor when the temperature of the freezer becomes the minimum value of the temperature range of the freezer.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 3 is a flowchart illustrating an operation of the operation speed change system apparatus for the refrigerator according to the present invention in FIG. 2;

DETAILED DESCRIPTION OF THE INVENTION

Reference will now be made in detail to the preferred embodiments of the present invention, examples of which are illustrated in the accompanying drawings.

Figure 1:
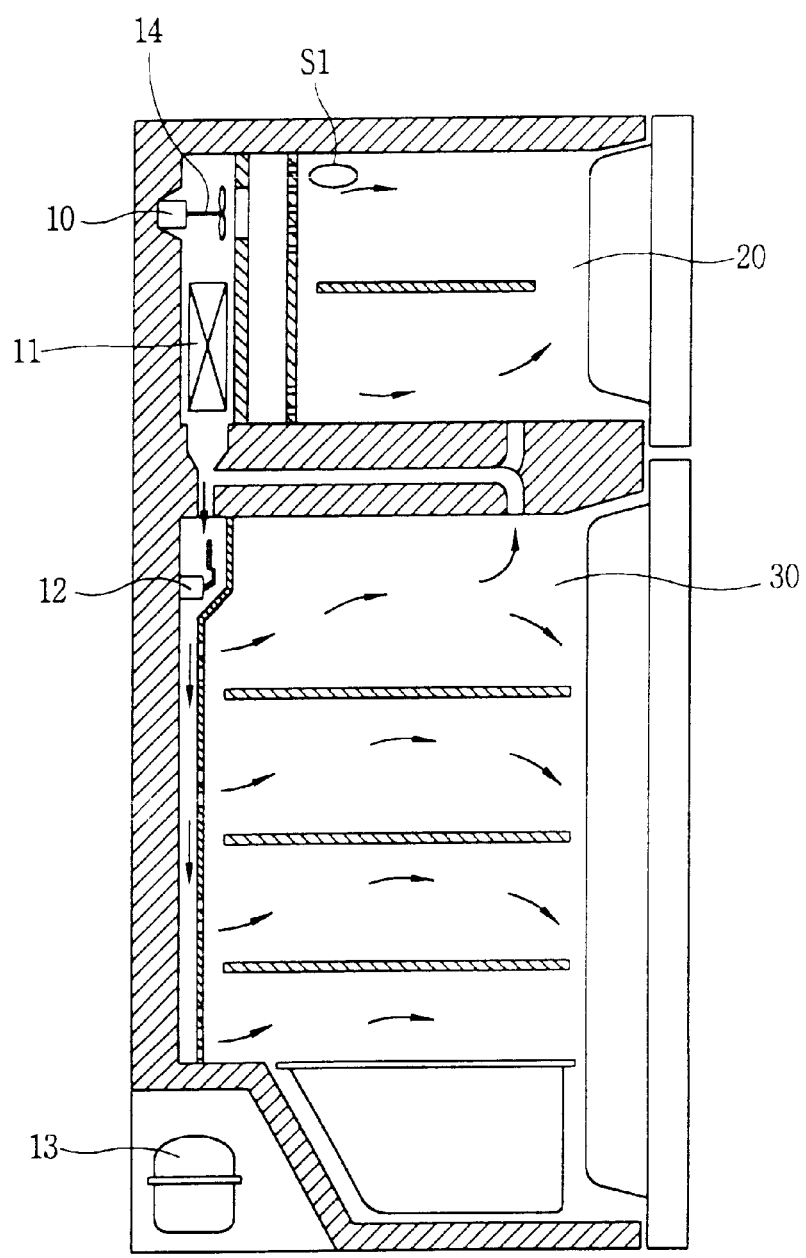
FIG. 1 is a schematic diagram of a conventional refrigerator.
Figure 2:
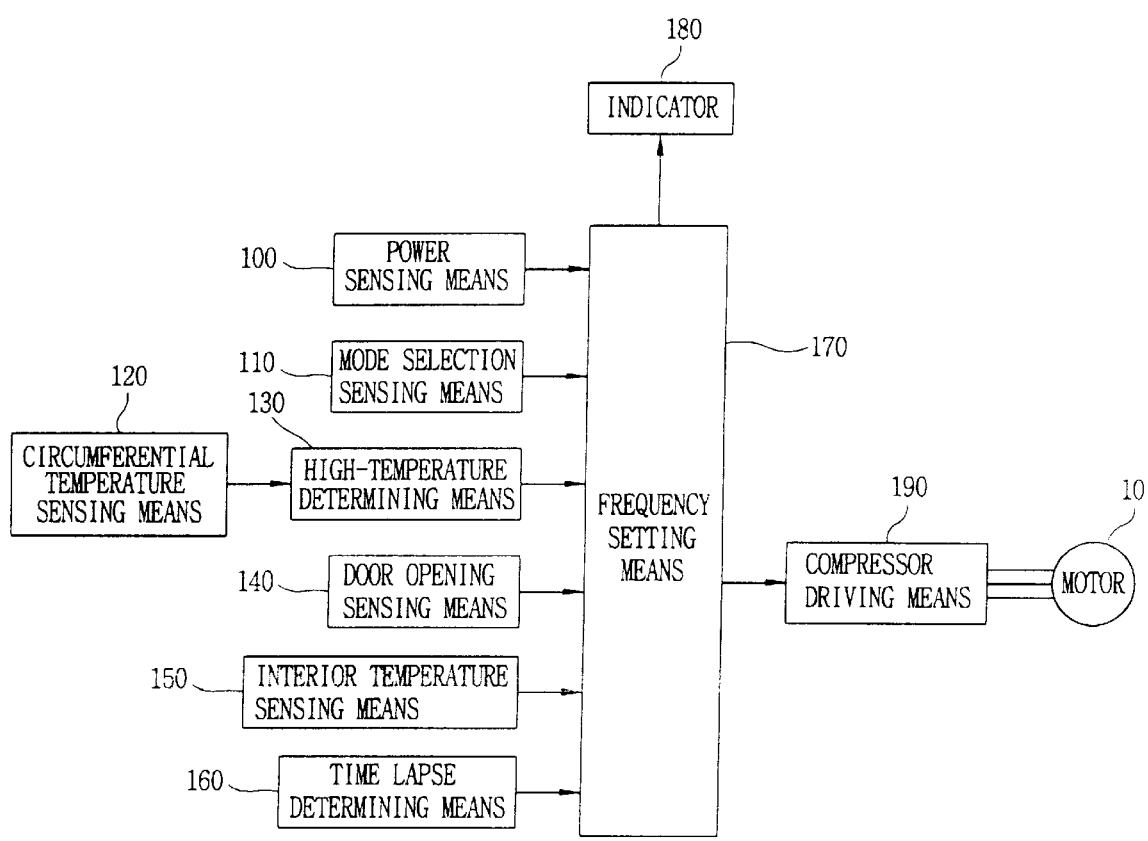
FIG. 2 is a block diagram illustrating an embodiment of a operation speed change system for a refrigerator according to the present invention.
Figure 4A:
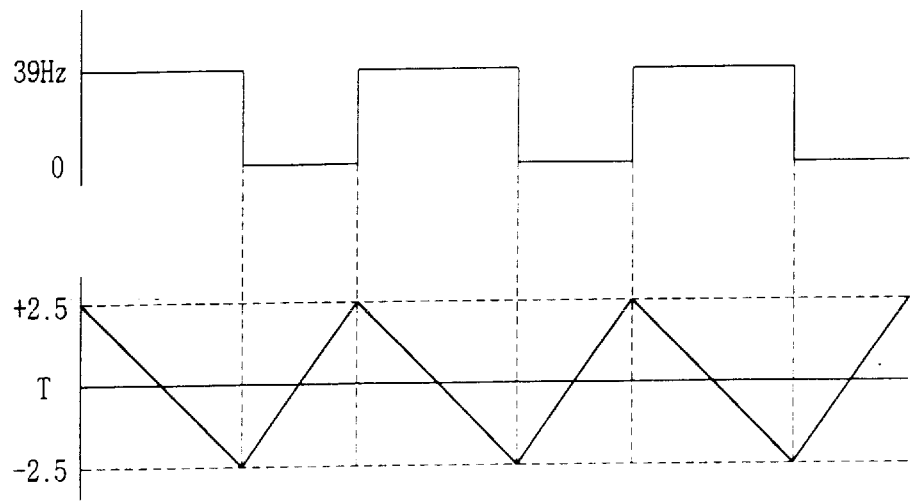
FIG. 4A is a diagram illustrating a change of an operation frequency when a door of a refrigerator is not opened in the present invention.
Figure 4B:
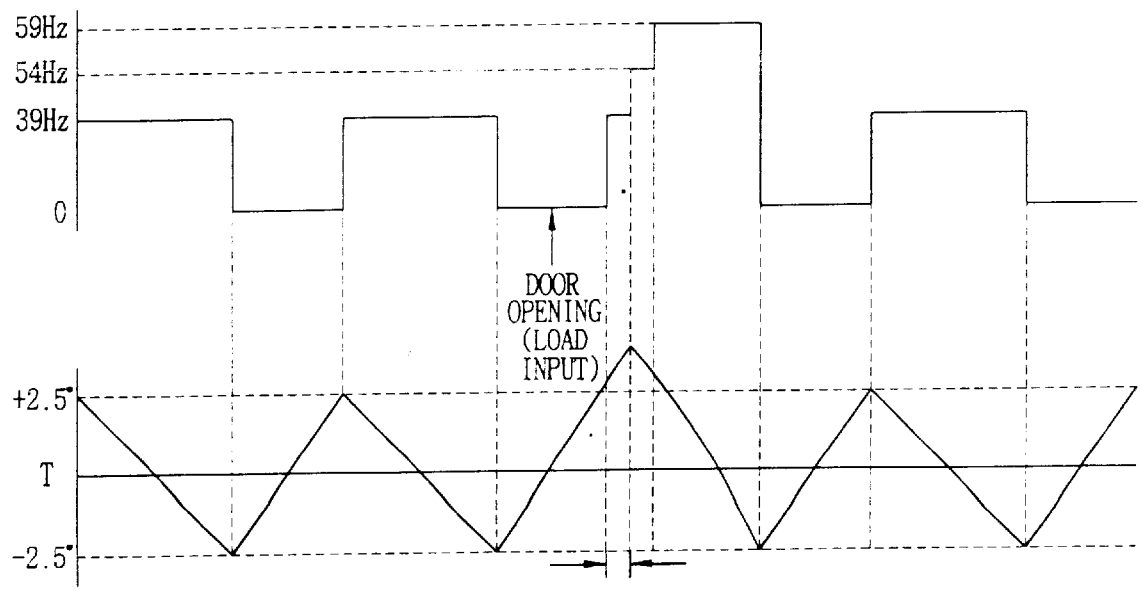
FIG. 4B is a diagram illustrating a change of an operation frequency when there is a door opening of a refrigerator applied to the present invention.

FIG. 2 is a block diagram illustrating a operation speed change system for a refrigerator according to the present invention according to an embodiment of the present invention. As shown therein, the operation speed change system includes: a power sensing means 100 sensing an input of power in an initial state, a mode selection sensing means 110 sensing a mode selection of the user; a circumferential temperature sensing means 120 sensing a temperature in the vicinity of the refrigerator; a temperature comparing means 130 determining whether the temperature sensed by the circumferential temperature sensing means 120 is higher than a previously set temperature; a door opening sensing means 140 sensing the door opening of the refrigerator; an interior temperature sensing means 150 sensing a temperature inside the refrigerator; a time lapse determining means 160 measuring the predetermined time elapsed from a referential point of time when the door opening is sensed by the door opening sensing means 140; a frequency setting means 170 setting a frequency in accordance with outputs from the power sensing means 100, the mode selection sensing means 110, the temperature comparing means 130, the door opening sensing means 140, the interior temperature sensing means 150 and the time lapse determining means 160; an indicator 180 indicating an operation frequency set by the frequency setting means 170 to a user; and a compressor driving means 190 driving a motor 10 at the frequency determined by the frequency setting means 170 and outputting a signal to the time lapse determining means 160 for the referential point of time.

FIG. 3 is a flowchart illustrating an operation of the operation speed change system apparatus in FIG. 2.

When the operation speed change system according to the present invention determines whether a current temperature T of the freezer sensed by the interior temperature sensing means 150 is higher than a maximum value T1 of a previously set temperature range of the freezer, for example, T−2.5° C.<T<T+2.5° C., wherein T=the previously set freezer temperature and T1 is T+2.5° C. When the current temperature T is higher than T1, the system checks whether the initial power input is not sensed and, if the power input is not sensed, checks whether a quick freezing mode is selected in the mode selecting means 110 by the user. If no selection is made to the quick freezing mode, it is determined whether the circumferential temperature sensed by the circumferential temperature sensing unit 120 is higher than the previously set temperature, for example, 35° C. If the sensed circumferential temperature is higher than the set temperature, the system determined through the door opening sensing means whether there was the door opening.

When the door was not opened, the frequency setting means 170 determines the operation frequency of the compressor as a predetermined referential frequency, for example, as 39 Hz, as shown in FIG. 3A, informs the determined operation frequency to the user through the indicator 180, operates the compressor motor 10 at a low speed through the compressor driving means 190 and returns to the initial state.

If there was the door opening, as shown in FIG. 3B, the time lapse determining means 160 determines whether the predetermined time (for example, 5 minutes) has elapsed. When the predetermined time has not elapsed, the frequency setting means 170 maintains the compressor motor 10 to continuously operate at the low speed (39 Hz) and if the predetermined time has elapsed, it is determined whether the current temperature T of the freezer is higher than the maximum value T1. If the current temperature T of the freezer is lower than the maximum value T1, the frequency setting means 170 maintains the motor 10 to operate at the low speed and if the current temperature T of the freezer is higher than the maximum value T1, it is checked whether the low speed operation is being processed. If the low speed operation is performed, the frequency setting means 170 increases the frequency by one step, which is a middle speed operation, for example, at 54 Hz. If it is determined that the low speed operation 39 Hz is not processed, the frequency setting means 170 determines that the middle speed operation 54 Hz is being performed and thus increases the frequency by one step, which is a high speed operation, for example, at 59 Hz. In addition, when the circumferential temperature is higher than the set temperature, the quick mode is selected or the initial power input is sensed, the operation speed operates the compressor at the high speed with the maximum rotation number, then returns to the initial state and stops the driving of the compressor to finish its operation when the current temperature T of the freezer is below a lowest value T2, that is T–2.5° C.

As described above, the operation speed change system and method for the inverter refrigerator according to the present invention sets the fundamental operation frequency as 39 Hz to reduce the power consumption, rapidly increases the operation frequency when the food is loaded into the refrigerator by the door opening, thereby maintaining the freshness of the food, and operates the compressor with the maximum rotation number when the temperature outside the refrigerator is determined at the high temperature, which results in the improvement of the reliability of the compressor and the decrease in the power consumption by eliminating frequent starting operations.

Also, the operation speed change system for the inverter refrigerator according to the present invention senses the initial power input and thus operates at the high speed, thereby achieving the quick freezing from the installation point of time and reads the temperature inside the refrigerator in accordance with the predetermined time elapsed from the door opening point, whereby the operation frequency can be reset in accordance with the volume of the load placed in the refrigerator to rapidly cool down the food and when the door is opened without any input of the food, power consumption produced from the unnecessary high speed operation can be reduced.

It will be apparent to those skilled in the art that various modifications and variations can be made in the operation speed change system and method for the refrigerator of the present invention without departing from the spirit or scope of the invention. Thus, it is intended that the present invention cover the modifications and variations of this invention provided they come within the scope of the appended claims and their equivalents.

What is claimed is:

1. An operation speed change system for an inverter refrigerator, comprising:
    a circumferential temperature sensing means for sensing an exterior temperature in the vicinity of the refrigerator;
    a temperature comparing means for determining whether the temperature sensed by the circumferential temperature sensing means is higher than a previously set temperature;
    a door opening sensing means for sensing the door opening of the refrigerator;
    a time lapse determining means for measuring the predetermined time elapsed from a referential point of time when the door opening is sensed by the door opening sensing means;
    a frequency setting means for setting a frequency in accordance with outputs from the door opening sensing means, the temperature comparing means and the time lapse determining means; and
    a compressor driving means for driving a motor at the frequency determined by the frequency setting means and outputting a signal to the time lapse determining means for the referential point of time.

2. An operation speed change system for an inverter refrigerator, comprising:
    a power sensing means for sensing an input of power in an initial state;
    a door opening sensing means for sensing the door opening of the refrigerator;
    an interior temperature sensing means for sensing a temperature inside the refrigerator;
    a time lapse determining means for measuring the time elapsed from a referential point of time when the door opening is sensed by the door opening sensing means;
    a frequency setting means for setting a frequency in accordance with outputs from the power sensing means, the door opening sensing means, the interior temperature sensing means and the time lapse determining means; and
    a compressor driving means for driving a motor at the frequency determined by the frequency setting means and outputting a signal to the time lapse determining means for the referential point of time.

3. An operation speed change system for an inverter refrigerator, comprising:
    a power sensing means for sensing an input of power in an initial state;
    a circumferential temperature sensing means for sensing an exterior temperature in the vicinity of the refrigerator;
    a temperature comparing means for determining whether the temperature sensed by the circumferential temperature sensing means is higher than a previously set temperature;
    a door opening sensing means for sensing the door opening of the refrigerator;
    an interior temperature sensing means for sensing a temperature inside the refrigerator;
    a time lapse determining means for measuring the time elapsed from a referential point of time when the door opening is sensed by the door opening sensing means;
    a frequency setting means for setting a frequency in accordance with outputs from the power sensing means, the temperature comparing means, the door opening sensing means, the interior temperature sensing means and the time lapse determining means; and
    a compressor driving means for driving a motor at the frequency determined by the frequency setting means and outputting a signal to the time lapse determining means for the referential point of time.

4. An operation speed change system for an inverter refrigerator, comprising:
    a power sensing means for sensing an input of power in an initial state;
    a mode selection sensing means for sensing a mode selection of the user;
    a circumferential temperature sensing means for sensing an exterior temperature in the vicinity of the refrigerator;
    a temperature comparing means for determining whether the temperature sensed by the circumferential temperature sensing means is higher than a previously set temperature;

a door opening sensing means for sensing the door opening of the refrigerator;

an interior temperature sensing means for sensing a temperature inside the refrigerator;

a time lapse determining means for measuring the time elapsed from a referential point of time when the door opening is sensed by the door opening sensing means;

a frequency setting means for setting a frequency in accordance with outputs from the power sensing means, the mode selection sensing means, the temperature comparing means, the door opening sensing means, the interior temperature sensing means and the time lapse determining means; and a compressor driving means for driving a motor at the frequency determined by the frequency setting means and outputting a signal to the time lapse determining means for the referential point of time.

5. In an operation method for an inverter refrigerator having operation frequencies in various steps, an operation speed change method for an inverter refrigerator comprising:

sensing when a door of the refrigerator opens; and sensing a temperature inside the refrigerator after a predetermined time period has elapsed after the sensed door opening, and continuously operating at a current operation frequency if a temperature increase is smaller than a predetermined value or transiting to an operation frequency which is one-step higher than the current operation frequency if the temperature increase is greater than a predetermined value, the above step being repeatedly performed until the operation frequency becomes a highest frequency.

6. An operation speed change method for an inverter refrigerator, comprising the following steps:

(a) determining whether a current temperature inside the refrigerator is greater than a maximum value of a previously set temperature range of a freezer;

(b) determining whether or not it is an initial power input when the current temperature inside the refrigerator is greater than the maximum value of the previously set temperature range of the freezer;

(c) performing a high-speed operation when it is determined to be the initial power input or determining whether a fast mode is selected when it is not determined to be the initial power input;

(d) performing the high-speed operation when the fast mode is inputted or determining whether a peripheral temperature is higher than a predetermined set temperature if the fast mode is not selected;

(e) performing the high-speed operation when the peripheral temperature is higher than the predetermined set temperature, or determining whether there was a door opening when the peripheral temperature is lower than the predetermined set temperature; and (f) operating at a predetermined referential frequency when there was no door opening and then returning to step (a), or sensing a temperature inside the refrigerator at predetermined time intervals when there was a door opening, thereby increasing a predetermined frequency by one step until the temperature inside the refrigerator becomes below the maximum value of the previously set temperature range of the freezer when the sensed temperature inside the refrigerator is above the maximum value thereof, or suspending the driving of a compressor when the sensed temperature inside the refrigerator is below the maximum value thereof.

7. The method according to claim 6, wherein when the temperature of the freezer is lower than the maximum value of the previously set temperature range thereof in step (a), the method determines whether the temperature of the freezer is lower than a minimum value of the previously set temperature range thereof, and then the method suspends the driving of the compressor and returns to step (a) when the temperature of the freezer is lower than the minimum value thereof, or operates the freezer at the predetermined referential frequency when the temperature of the freezer is greater than the minimum value thereof.

8. The method according to claim 6, wherein step (f) includes:

(g) determining whether a predetermined time has elapsed when it is determined there was the door opening in step (e);

(h) determining whether the current temperature inside the freezer is greater than the maximum value of the previously set temperature range of the freezer;

(i) operating at a predetermined referential frequency (a low-speed operation) and then returning to step (a), when it is determined in steps (g), (h) that the predetermined time has not elapsed or that the current temperature inside the freezer is smaller than the maximum value of the previously set temperature range of the freezer;

(j) determining whether the refrigerator is operating in a the low-speed operation mode when it is determined in step (i) that the current temperature inside the freezer is larger than the maximum value of the previously set temperature range of the freezer; and (k) operating by increasing the frequency by one step (a middle-speed operation) when it is determined in step (j) that the refrigerator is in the low-speed operation, or increasing the frequency by one step from the middle-speed operation to a high-speed operation when it is not determined that the refrigerator is in the low-speed operation and then suspending the operation of the compressor when the temperature of the freezer becomes the minimum value of the temperature range of the freezer.

9. The method of claim 6, wherein the referential frequency is 39 Hz.

10. The method of claim 6, wherein the maximum and minimum values of the previously set temperature range of the freezer are +2.5° C.

11. An operation speed change system for a refrigerator, comprising:

a power sensor configured to sense when power is first applied to the refrigerator;

a frequency setting circuit for setting an operation frequency based on an output from the power sensor, wherein the frequency setting circuit increases the operation frequency above a nominal level when the power sensor indicates that power is first applied to the refrigerator; and a compressor driving circuit for driving a compressor motor of the refrigerator at the frequency determined by the frequency setting circuit.

12. The operation speed change system of claim 11, further comprising:

a circumferential temperature sensor for sensing an exterior temperature in the vicinity of the refrigerator; and a temperature comparing circuit for comparing the temperature sensed by the circumferential temperature sensor to a predetermined temperature; and wherein the frequency setting circuit also sets the operation frequency based on an output from the temperature comparing circuit.

13. The operation speed change system of claim 11, further comprising:
   a door opening sensor configured to detect when a door of the refrigerator is opened;
   a time counting circuit configured to determine when a predetermined period of time has elapsed since the door opening sensor detects an opening of the refrigerator door;
   an interior temperature sensor configured to detect a temperature within the refrigerator after the time counting circuit determines that the predetermined period of time has elapsed; and
   wherein the frequency setting circuit also sets the operation frequency based on outputs from the time counting circuit and the interior temperature sensor.

14. An operation speed change system for a refrigerator, comprising:
   a circumferential temperature sensor for sensing an exterior temperature in the vicinity of the refrigerator;
   a temperature comparing circuit for comparing the temperature sensed by the circumferential temperature sensor to a predetermined temperature;
   a frequency setting circuit for setting an operation frequency based on an output from the temperature comparing circuit, wherein the frequency setting circuit increases the operation frequency above a nominal level when the temperature comparing circuit indicates that the temperature sensed by the circumferential temperature sensor exceeds the predetermined temperature; and
   a compressor driving circuit for driving a compressor motor of the refrigerator at the frequency determined by the frequency setting circuit.

15. The operation speed change system of claim 14, further comprising:
   a door opening sensor configured to detect when a door of the refrigerator is opened;
   a time counting circuit configured to determine when a predetermined period of time has elapsed since the door opening sensor detects an opening of the refrigerator door;
   an interior temperature sensor configured to detect a temperature within the refrigerator after the time counting circuit determines that the predetermined period of time has elapsed; and
   wherein the frequency setting circuit also sets the operation frequency based on outputs from the time counting circuit and the interior temperature sensor.

16. A method of controlling an operation speed of a compressor motor of a refrigerator, comprising:
   sensing when power is initially applied to the refrigerator; and
   increasing the operation speed of the compressor motor above a nominal speed when it is sensed that power has been initially applied to the refrigerator to rapidly cool the interior of the refrigerator.

17. The method of claim 16, further comprising:
   sensing an exterior temperature in the vicinity of the refrigerator;
   comparing the sensed temperature in the vicinity of the refrigerator with a predetermined temperature; and
   increasing the operation speed of the compressor motor above a nominal speed when it is determined that the sensed temperature in the vicinity of the refrigerator exceeds the predetermined temperature.

18. The method of claim 16, further comprising:
   sensing when a door of the refrigerator opens;
   sensing a temperature within the refrigerator after a predetermined period of time has elapsed since the door opening was sensed; and
   operating the compressor motor at the current speed if a temperature increase within the refrigerator does not exceed a predetermined amount, or increasing the operating speed of the compressor motor if a temperature increase within the refrigerator exceeds the predetermined amount.

19. A method of controlling an operation speed of a compressor motor of a refrigerator, comprising:
   sensing an exterior temperature in the vicinity of the refrigerator;
   comparing the sensed temperature in the vicinity of the refrigerator with a predetermined temperature; and
   increasing the operation speed of the compressor motor above a nominal speed when it is determined that the sensed temperature in the vicinity of the refrigerator exceeds the predetermined temperature.

20. The method of claim 19, further comprising:
   sensing when a door of the refrigerator opens;
   sensing a temperature within the refrigerator after a predetermined period of time has elapsed since the door opening was sensed; and
   operating the compressor motor at the current speed if a temperature increase within the refrigerator does not exceed a predetermined amount, or increasing the operating speed of the compressor motor if a temperature increase within the refrigerator exceeds the predetermined amount.

* * * * *